United States Patent [19]

Becker

[11] 4,373,936

[45] Feb. 15, 1983

[54] FILTER BAG TENSIONING DEVICE AND METHOD

[75] Inventor: Andrew R. Becker, Ellicott City, Md.

[73] Assignee: Koppers Company, Inc., Pittsburgh, Pa.

[21] Appl. No.: 175,376

[22] Filed: Aug. 6, 1980

[51] Int. Cl.³ .............................................. B01D 46/00
[52] U.S. Cl. ......................................... 55/97; 55/378;
177/246; 248/95; 248/325
[58] Field of Search ..................... 55/378, 379, 96, 97;
248/95, 99, 100, 101, 324, 325, 364; 74/590,
469; 160/207, 213, 146; 254/243, 251, 256;
177/246, 212, 235-237

[56] References Cited
U.S. PATENT DOCUMENTS

| 497,670 | 5/1893 | Kroll | 74/590 |
|---|---|---|---|
| 3,106,977 | 10/1963 | Wells | 177/246 |
| 3,504,729 | 4/1970 | Alton | 160/207 |
| 3,683,595 | 8/1972 | Houghton et al. | 55/378 |
| 3,698,496 | 10/1972 | Lohmann | 177/246 |
| 4,217,117 | 8/1980 | Syverson | 55/378 |

Primary Examiner—Bernard Nozick

Attorney, Agent, or Firm—Thomas F. Shanahan; Oscar B. Brumback; Herbert J. Zeh, Jr.

[57] ABSTRACT

A filter bag tensioning device for use in a bag house is disclosed. The tensioning device comprises a straight lever arm adapted to be pivotally mounted in the upper reaches of a bag house and carrying, on the end of the lever arm opposite that of filter bag attachment, a semi-fixed counterweight. The semi-fixed counterweight is prevented from rotating as its end of the lever arm moves in an ascending direction from a horizontal position but is free to rotate as its end of the lever arm moves in a descending direction from horizontal, to thereby continuously maintain a desired design tension on an attached filter bag. In a preferred embodiment, the lever arm can also be rotated to a vertical position and then moved longitudinally of its pivot to substantially lower the filter bag attachment point, thereby greatly facilitating attachment and replacement of filter bags and, in a further preferred aspect, to permit these operations to be performed by a workman having both hands free. Also, the tensioning device is preferably mounted so as to permit maximum pivoting of the lever arm during bag cleaning operations and, accordingly, maximum deflection of and minimum stress on a filter bag attached to the tensioning device.

17 Claims, 6 Drawing Figures

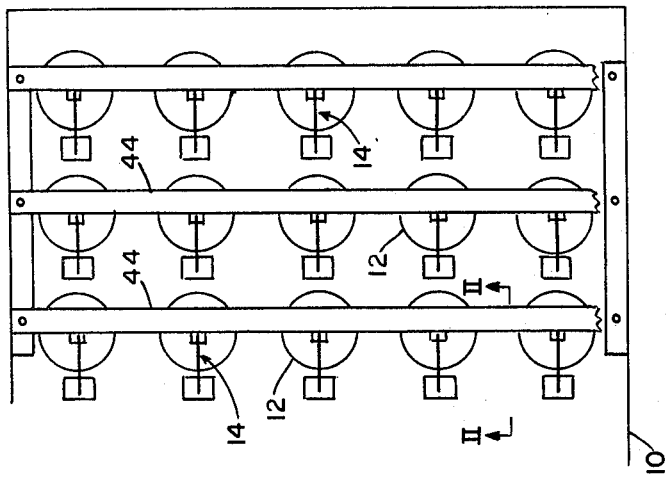
FIG. 1
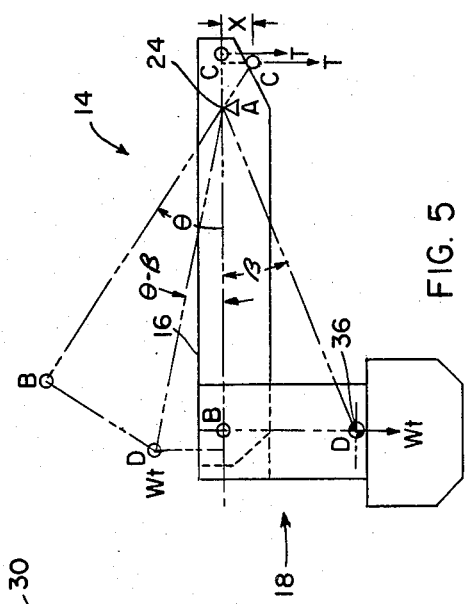
FIG. 5
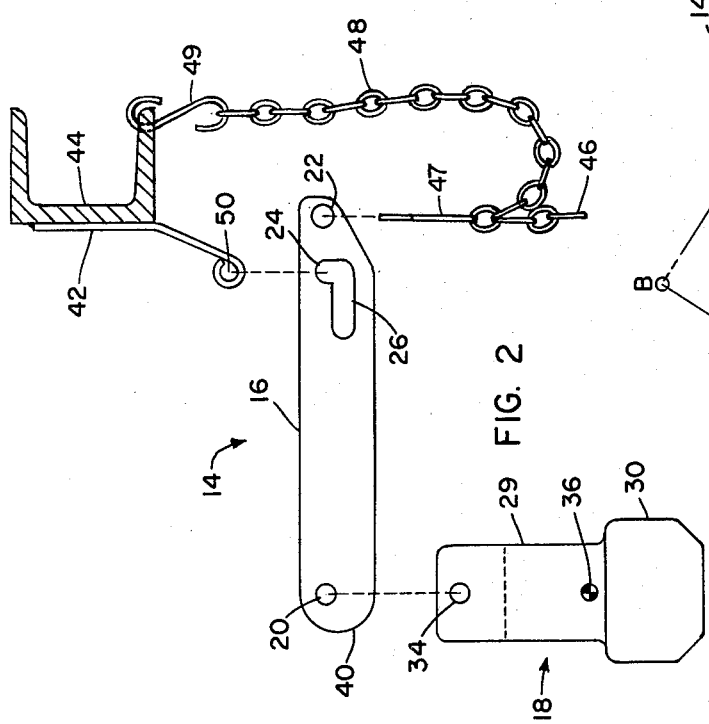
FIG. 2
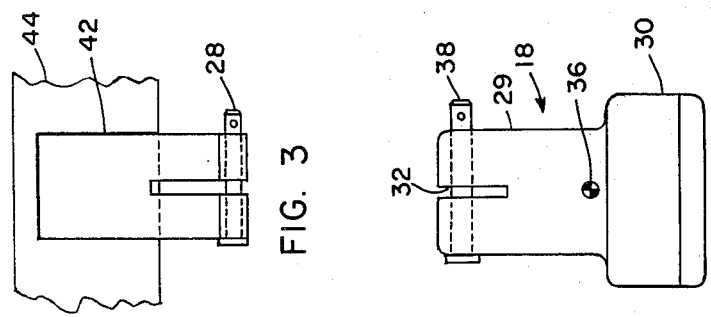
FIG. 3
FIG. 4

FILTER BAG TENSIONING DEVICE AND METHOD

BACKGROUND OF THE INVENTION

1. Field of the Invention

This invention relates to separating particulates from a flowing gaseous stream and, more specifically, to an improved filter bag tensioning device of the counterweighted lever type for use in a bag house. The invention also encompasses novel means and a method for removing and/or attaching filter bags.

2. Description of the Prior Art

Prior to the instant invention, numerous devices have been employed in bag houses to provide tension in filter bags such that the bags are maintained in a substantially taut condition throughout all conditions of intended operation. Such prior art devices have run the gamut from pretensioning with no adjustment, to tensioning with simple manual adjustment, to various biasing devices including springs and various counterweighted levers. The present invention is generally concerned with tensioning devices of the counterweighted lever type such as, by way of example, that disclosed in U.S. Pat. No. 3,683,595. However, the present invention provides a number of distinct improvements over such known prior art counterweighted lever tensioning devices.

Specifically, none of the known prior art counterweighted tensioning devices have the following unique features:

a. constant bag tension when the filter bag attachment end of the lever arm is at or above a horizontal position and minimum equilibrium bag tension when the filter bag attachment end of the lever arm is below a horizontal position so as to minimize stress on the filter bag material;

b. the ability to lower the bag attachment point for ease of filter bag attachment and detachment;

c. hands-free attachment and detachment of filter bags; and d. no tools are required to attach, detach, or properly tension the filter bags; and e. maximized bag deflection with minimum equilibrium tension during cleaning to provide assurance for tear-free cleaning of the filter bags.

The present invention completely fulfills all of the above desiderata and, in so doing, overcomes most or all of the known deficiencies of prior art filter bag tensioning devices.

SUMMARY OF THE INVENTION

In accordance with the present invention, there is provided a filter bag tensioning device for use in a bag house which comprises a straight lever arm adapted to be pivotally mounted in the upper reaches of a bag house and carrying, on the end of the lever arm opposite that of filter bag attachment, a semi-fixed counterweight. The semi-fixed counterweight is prevented from rotating as its end of the lever arm moves in an ascending direction from a horizontal position, but is free to rotate as its end of the lever arm moves in a descending direction from horizontal to thereby continuously maintain a desired design tension on an attached filter bag. With this arrangement, constant bag tension is provided when the filter bag attachment end of the lever arm is at or above a horizontal position and minimum equilibrium bag tension is maintained when the filter bag attachment end of the lever arm is below a horizontal position so as to minimize stress on the filter bag material. An additional aspect of the tensioning device of this invention is that the lever arm can be rotated to a vertical position and then moved longitudinally of its pivot to substantially lower the filter bag attachment point, thereby greatly facilitating attachment and replacement of filter bags and, in a further aspect, by blocking the lever arm in this vertical position and manual rotation of the counterweight, these operations are permitted to be performed by a workman having both hands free and without the use of any tools. In addition, the tensioning device is preferably mounted so as to permit maximum pivoting of the lever arm during bag cleaning operations and, accordingly, maximum deflection of and minimum stress on a filter bag attached to the tensioning device.

The foregoing and other objects, features and advantages of this invention will become more apparent with further consideration of the disclosure thereof and, in particular, when viewed in conjunction with the following specification, the accompanying drawings and the appended claims.

BRIEF DESCRIPTION OF THE DRAWINGS

FIG. 1 is a schematic plan view of the upper reaches of a portion of a bag house illustrating a plurality of filter bags attached at their upper end to the counterweighted tensioning device of this invention.

FIG. 2 is generally taken along the line II—II of FIG. 1 and is an exploded view in side elevation and partly in section of a tensioning device and typical tensioning device mounting arrangement in accordance with this invention.

FIG. 3 is a front elevation as viewed from the left side of FIG. 2 of the mounting bracket of FIG. 2 and showing a pivot pin not shown in FIG. 2.

FIG. 4 is a front elevation as viewed from the left side of FIG. 2 of the counterweight of FIG. 2.

FIG. 5 is a schematic illustration of the counterweighted tensioning device of this invention provided for the purpose of explaining its operation and attendant geometric relationships.

DESCRIPTION OF THE PREFERRED EMBODIMENT

Figure 6:
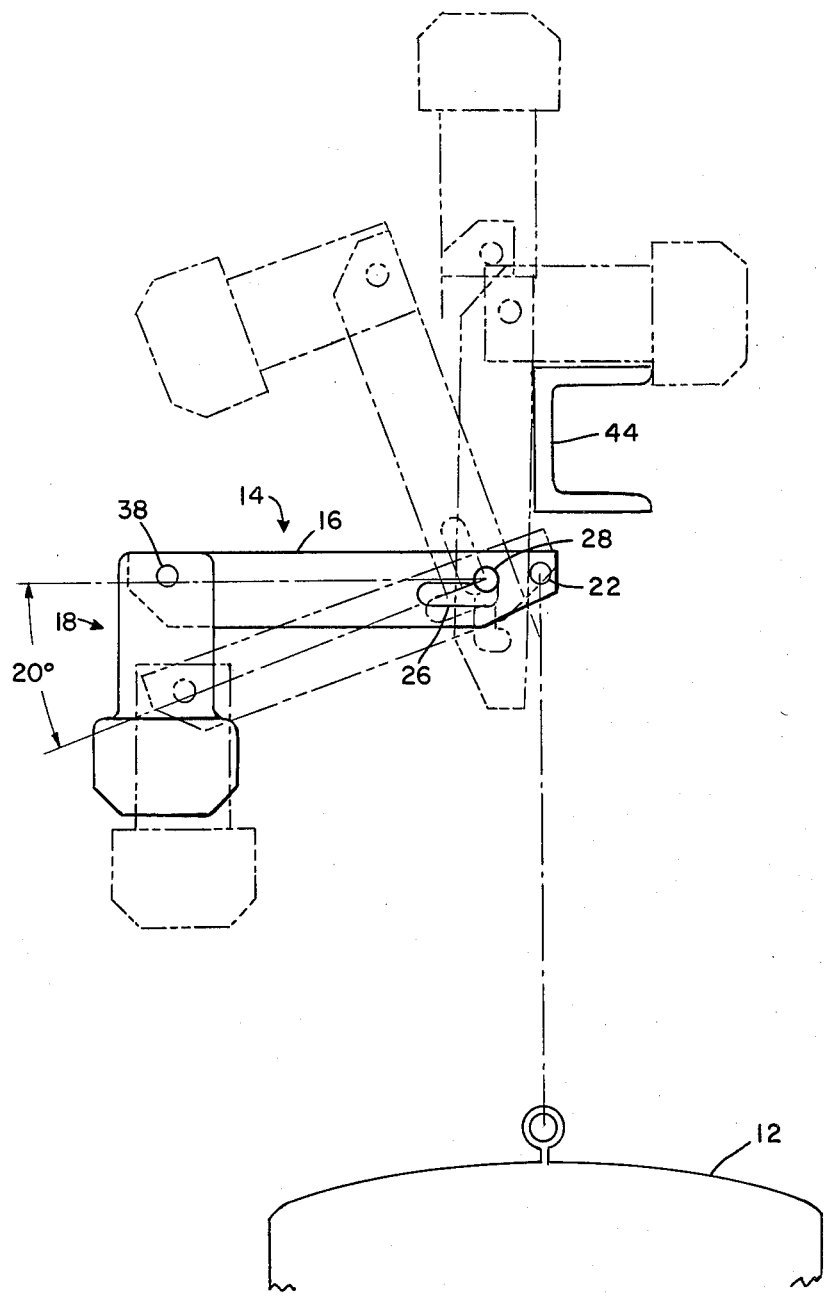
FIG. 6 is a schematic side elevation of the tensioning device of this invention illustrating its relationship to the top of a filter bag and showing, in phantom, various operating positions it may typically assume.

Referring to the drawings and, in particular, to FIG. 1, there is schematically illustrated a plan view of the upper reaches of a portion of a bag house 10. The function and operation of a bag house is, per se, well known to those skilled in the art of gas filtration and, accordingly, it is not deemed necessary to give a detailed explanation of such matters herein. It should be sufficient to state that particle-laden gas, frequently dust-laden air, is continuously passed into an enclosure, i.e., bag house 10, in which is supported a plurality of elongated fabric filter bags 12, such as, for example, filter bags or filter tubes having an 8-inch diameter and being 22 feet in length. Depending on the desired arrangement, the air may be cleansed of its particulate matter as it passes either from the inside of the bags to the outside of the bags (the arrangement of FIG. 1) or vice versa. The cleansed air is then extracted from the bag house.

Over a period of time, particulate matter continues to build up on the filter bags 12. In accordance with the present invention, as particulate material either accumulates on or suddenly falls from the inside of the filter bag, as by reverse air cleaning or by its own weight build-up, balancing tension is continuously provided while permitting reasonable longitudinal movement of the filter bags. Providing for reasonable longitudinal contraction or positive deflection of the bags to occur is essential so that the bag material is not overstressed to the point of tearing. Also, providing for reasonable longitudinal expansion or negative deflection of the bags to occur, hereinafter referred to as bag growth, is essential to prevent excessive cuffing or bulging at the bottom of the bag which, in time, is also destructive of the bag material. Bag growth occurs, for example, from the bag stretching with age or from a higher thermal growth rate for the bag than the bag house structure. In either case, it is a desideratum of this invention to provide a counterweighted bag tensioning device 14 that continuously applies balancing or equilibrium tension while permitting reasonable longitudinal movement of the filter bags to occur.

For the foregoing purposes, as is best shown in FIGS. 2 to 4, there is provided a counterweighted, filter bag tensioning device 14 comprised of an elongated lever arm 16 and a semi-fixed counterweight 18. As viewed in FIG. 2, lever arm 16 is provided on its left end with a weight securement means comprising a circular opening or bore 20 extending through the lever arm 16. On its right or distal end and longitudinally aligned with opening 20, lever arm 16 is similarly provided with a filter bag support means comprising a circular opening or bore 22 extending through the lever arm. At a point intermediate openings 20 and 22 and in substantial longitudinal alignment therewith there is provided a pivot opening or aperture 24 also extending through the lever arm. For reasons of obtaining desired mechanical advantage, pivot aperture 24 is substantially closer to filter bag support opening 22 than it is to weight securement opening 20.

For reasons that will be clearer hereinafter, lever arm 16 is also provided with an elongated slot 26, of a size sufficient to receive the pivot pin or pivot 28, communicating with the pivot aperture 24 and being generally offset therefrom and extending longitudinally toward the weight securement opening 20 to thereby form with pivot aperture 24 a substantially L-shaped opening in lever 16. Although slot 26 is shown as extending substantially parallel to the opposite longitudinal edges of lever arm 16, it will be appreciated from what follows hereafter that slot 26 could extend longitudinally toward weight securement opening 20 and also either downwardly or upwardly, as viewed, toward one of the opposite longitudinal edges of lever arm 16.

Semi-fixed counterweight 18, in the embodiment shown, is a solid metal casting or body member consisting of a generally rectangular or regular parallelepiped shaped upper portion 29 merging into an enlarged, generally rectangular or regular parallelepiped shaped lower portion 30. It will be understood, of course, from that which follows, that the shape of the counterweight 18 is of no particular significance other than to establish a desired vertically downward location for its center of gravity and to provide a symmetrical shape so that its center of gravity can be readily located and positioned directly below its attachment point to lever arm 16.

For attachment purposes, the counterweight 18 has a transverse slot 32 extending through the top or free end of upper portion 29 and, at 90° thereto, a circular opening or bore 34, both of which are in vertical alignment with the counterweight's center of gravity, designated at 36. The width of the slot 32 is such as to readily receive therein the weight securement end of lever arm 16 and the distance from the axis of circular bore 34 to the bottom of the slot 32 is substantially identical to the distance from the axis of circular bore 20 to the bottom longitudinal edge of lever arm 16, as viewed in FIG. 2. Accordingly, when counterweight 18 is attached to lever arm 16 by passing a pin 38 through circular bores 34 and 20, the counterweight is precluded from rotating in a counterclockwise direction. However, the location of circular bore 20 relative to the semi-circular tip 40 of the weight securement end of lever arm 16 is such that clockwise rotation is permitted and, in the embodiment shown in FIG. 2, clockwise rotation is permitted to the extent of slightly more than 180°.

As will be readily appreciated, in the embodiment shown, lever arm 16 is pivotally supported in the upper reaches of bag house 10 by means of a suitable bracket 42, welded or otherwise secured to crossbar 44. Obviously, the bent and slotted hinge plate type bracket shown is merely exemplary of a wide variety of brackets that may be used to provide pivotal support. Also, the S-hook 47 and chain 46 that is shown for attaching the top of a filter bag 12 to the lever arm's filter bag support means 22 is merely illustrative of one preferred type of attachment, as is also the inclusion therewith of the attached safety chain 48 secured by its S-hook 49 to crossbar 44. However, it should be noted in connection with bracket 42 that its pivot axis 50 is shown as desirably located below crossbar 44 and also leftwardly thereof, as viewed in FIG. 2. The particular leftward location of pivot axis 50 is most preferably chosen such that, without encountering obstruction, the weight securement end of the lever arm 16 can be rotated upwardly to an essentially vertical position and the lever arm 16 can then be laterally displaced to move pivot 28 into slot 26, thereby permitting the bag support end of the lever arm 16 to move generally vertically downward with respect to pivot 28. Also, the pivot 28 should be sufficiently below crossbar 44 such that, without encountering obstruction, the filter bag support end of the lever arm 16 can be rotated upwardly, preferably until such further rotation is prevented by mounting bracket 42. In this manner, maximized bag deflection and bag growth are permitted.

Turning now to FIGS. 5 and 6, shown are schematic illustrations of the counterweighted tensioning device 14 of this invention for the purpose of further explaining its operation and attendant geometric relationships. With particular reference to FIG. 5, illustrated in full line drawing is a counterweighted tensioning device 14 with its lever arm 16 disposed in a horizontal position and, superimposed thereon, in phantom, is illustrated a typical position of tensioning device 14 as the weight securement end of its lever arm 16 moves in an ascending direction from horizontal. In the disposition of the tensioning device 14, as shown in horizontal and in subsequent ascending positions of the weight securement end of its lever arm 16, the following relationships exist:

$$X = AC \sin \theta, \text{ and } T = Wt \times \frac{AD \cos (\theta - B)}{AC \cos \theta}$$

where,
- X = the downward vertical displacement of filter bag support opening 22 and, accordingly, an attached filter bag 12 from horizontal;
- θ = the degrees of angular movement of lever arm 16 from horizontal;
- B = the degrees of angular displacement of the center of gravity 36 of counterweight 18 from the pivot 24, when lever arm 16 is in a horizontal position;
- T = the available bag tension in units of tensile force, e.g., pounds;
- Wt = the weight of the counterweight 18 in corresponding units to that of T, e.g., pounds;
- AC = the distance from pivot 24 to the axis of filter bag support opening 22; and
- AD = the distance from pivot 24 to the center of gravity 36 of the counterweight 18.

On the other hand, in the disposition of the tensioning device 14 as shown in horizontal and in any descending position of the weight securement end of the lever arm 16 with respect to horizontal (FIG. 6), the following relationships exist:

$$X = AC \sin \theta, \text{ and } T = Wt \times \frac{AB \cos \theta}{AC \cos \theta} = Wt \times \frac{AB}{AC}$$

where, in addition to the foregoing,
- AB = the distance from pivot 24 to the axis of weight securement opening 20.

In brief summary, the foregoing relationships establish that, when the weight securement end of the lever arm is below or at horizontal and with proper choice of a weight Wt, a fixed, constant tension is available to be applied to the top of a filter bag 12 to maintain the filter bag taut, without overstressing, and to counterbalance the weight of filtered particulate material as it collects therein or thereon. Should, however, the weight of accumulated particulate material exceed this predetermined and preset, constant, counterbalancing force, the weight securement end of the lever arm will begin to ascend above horizontal where the counterweight 18 is no longer freely rotatable and assumes a fixed position with respect to lever arm 16. Under this circumstance, a moderately and gradually increasing counterbalancing force is made available to maintain the tensioning device 14 in equilibrium, without overstressing the fabric of a filter bag 12.

With attention being directed specifically to FIG. 6, shown is a schematic side elevation of the tensioning device of this invention illustrating its relationship to the top of a filter bag 12 and showing, in phantom, various operating positions it may typically assume. In accordance with a preferred, albeit not intended to be limiting, mode of operation of this invention, a counterweighted tensioning device 14 is provided having a predetermined counterweight Wt and predetermined distances AB, AC and AD (FIG. 5). These parameters are specifically selected to impart a desired design tension to a particular filter bag 12 and also to provide a desired mechanical advantage, coupled with the ability to generate a desired bag deflection vs. bag tension curve that will not result in overstressing the filter bag fabric.

Following the counterweight 18, in FIG. 6, in clockwise order, filter bag 12 is preferably initially attached to filter bag support means 22 such that the weight securement end of lever arm 16 resides somewhere in the range of between horizontal and about 20° below horizontal. The 20° range allows for the selection of an appropriate chain link for proper tensioning of the filter bag. As aforesaid, this is within the range of constant tension. As sufficient filtered particulates accumulate on the bag material, the lever arm 16 will begin to move toward the horizontal position, shown in full line drawing in FIG. 6. Generally, it is within this range that the pressure drop across the filter bag material reaches a value where removal of the filtered particulates is desirable. Notwithstanding, should the pressure drop not reach a value sufficient to signal for bag cleaning, the lever arm 16 will ascend from horizontal with counterweight 18 now fixed, rather than rotatable, relative thereto until the pressure drop reaches a value signaling for bag cleaning. In this initial zone above horizontal, the geometry of the tensioning device 14 is such that the generated bag deflection vs. bag tension curve has, from point to point, a substantially more moderate slope than other known bag tensioning devices and, accordingly, imparts much less stress to the filter bag fabric while maintaining equilibrium balance.

Once the pressure drop reaches a predetermined value, bag cleaning may proceed by any of the well known methods, such as rapping, forced air blow-down or reverse air cleaning. In any event, as the particulates fall from the bag material, a substantial suction is created causing the filter bag 12 to rapidly collapse and deflect in a downward direction. When this occurs, the lever arm 16, being unrestricted, will quickly ascend to the area of the third clockwise shown position which generally places the center of gravity of counterweight 18 about 60° to 80° above horizontal, as measured from pivot 24.

When bag cleaning is completed, the tensioning device 14 and filter bag 12 will reassume or substantially reassume their initial positions for the beginning of a further filtering cycle. However, if the filter bag is to be replaced, the weight securement end of the lever arm 16 is rotated, as shown, to a generally vertical disposition where it is blocked against further rotation by crossbar 44 and the counterweight 18 is then preferably rotated from about 90° to about 180° about its pivot pin 38 toward what is normally the upper longitudinal edge of lever arm 16 and the lever arm 16 is moved laterally to shift the pivot 28 into slot 26 to cause the filter bag attachment end of the lever arm to be lowered with respect to pivot 28. In this position the filter bag tensioning device is stable such that a workman, without the use of any tools and having both hands free, can then readily detach the existing filter bag and attach a new filter bag to the filter bag attachment means 22. Once filter bag attachment is completed, the counterweight 18 is then rotated back to its normal operating position, the weight securement end of the lever arm 16 is rotated to a generally horizontal or up to about 20° below horizontal position, as aforesaid, and the lever arm 16 is displaced to move the lever arm pivot pin 28 from slot 26 into pivot aperture 24 for the commencement of renewed or continued operation. The suggested 0° to 20° below horizontal position that the weight end of the lever arm may be positioned allows for the selection of an appropriate link in the suspension chain for proper tensioning of the filter bags.

According to the provisions of the patent statutes, the foregoing explains the principle, preferred construction and mode of operation of the invention and there has been illustrated and described what is now considered to represent its best embodiment. However, it should be understood that, within the scope of the appended claims, the invention may be practiced otherwise that as specifically illustrated and described.

What is claimed is:

1. A method of attaching and replacing a filter bag in a bag house in which an elongated lever is pivotally supported intermediate its ends at a desired pivot point by a pivot affixed within the upper reaches of said bag house and said lever is provided with filter bag support means adjacent one end and a weight and weight securement means adjacent its other end comprising, rotating the weight securement end of said lever to a generally vertical disposition, moving the bag support end of said lever generally vertically downward, attaching a filter bag to the filter bag support means, rotating the weight securement end of said lever to a generally lateral position relative to said pivot and displacing said lever to said desired pivot point and, when said filter bag is to be replaced, repeating the above sequence of steps with removal of the existing filter bag and attachment of a new filter bag.

2. A method as in claim 1 which further includes rotating the weight at least 90° about the weight securement means when the weight securement end of said lever is in a generally vertical disposition.

3. A method as in claim 1 which further includes rotating the weight at least 180° about the weight securement means when the weight securement end of said lever is in a generally vertical position.

4. A filter bag tensioning device for use in a bag house comprising an elongated lever pivotally supported intermediate its ends by a pivot affixed within the upper reaches of said bag house and extending through an aperture in the lever body at a desired pivot point, said lever being provided with filter bag support means adjacent one end and weight securement means adjacent its other end, said lever having an elongated slot, of a size sufficient to receive said pivot, communicating with said aperture and being generally offset therefrom and extending longitudinally toward said weight securement means.

5. A filter bag tensioning device as in claim 4 which further includes weight means operatively secured to said weight securement means and being so constructed and arranged that the center of gravity of said weight means can be moved relative to said weight securement means from one longitudinal side of said lever to the other longitudinal side of said lever.

6. A filter bag tensioning device as in claim 5 in which, in a horizontal position of said lever, the center of gravity of said weight means is below said weight securement means and, wherein, in positions of the weight securement end of said lever below horizontal, the distance from said center of gravity to said pivot varies from position to position and, in positions of the weight securement end of said lever above horizontal, the distance from said center of gravity to said pivot remains substantially constant.

7. A filter bag tensioning device for use in a bag house comprising an elongated lever pivotally supported intermediate its ends by a pivot affixed within the upper reaches of said bag house, said lever being provided with a filter bag support means adjacent one end and weight securement means adjacent its other end, weight means operatively attached to said weight securement means and being so constructed and arranged that it provides a constant force at said filter bag support means when said lever is in a horizontal position and in positions of the weight securement end of said lever below horizontal and, wherein, said force increases in positions of the weight securement end of said lever above horizontal.

8. A filter bag tensioning device for use in a bag house comprising an elongated lever pivotally supported intermediate its ends by a pivot affixed within the upper reaches of said bag house, said lever being provided with filter bag support means adjacent one end and weight securement means adjacent its other end, weight means operatively attached to said weight securement means and being so constructed and arranged that in a horizontal position of said lever the center of gravity of said weight means is below said weight securement means and during upward rotation of said weight means by said lever the distance from said center of gravity to said pivot remains substantially constant.

9. A filter bag tensioning device as in claim 8 wherein said weight means is further constructed and arranged such that the distance from said center of gravity to said pivot increases during downward rotation of said weight means from said horizontal position.

10. A filter bag tensioning device as in claim 9 wherein said weight means is so constructed and arranged that said center of gravity can be moved relative to said weight securement means from one longitudinal side of said lever to the other longitudinal side of said lever.

11. A filter bag tensioning device as in claim 9 wherein said weight means is so constructed and arranged that it can rotate at least 90° about said weight securement means.

12. A filter bag tensioning device as in claim 9 wherein said weight means is so constructed and arranged that it can rotate at least 180° about said weight securement means.

13. A filter bag tensioning device as in claim 9 which further includes means on said lever and operatively associated with said pivot to permit transverse displacement of said lever relative to said pivot followed by longitudinal displacement of said filter bag support means away from said pivot.

14. A filter bag tensioning device as in claim 13 wherein said weight means is so constructed and arranged that said center of gravity can be moved relative to said weight securement means from one longitudinal side of said lever to the other longitudinal side of said lever.

15. A filter bag tensioning device as in claim 9 wherein said pivot extends through an aperture in said lever body at a desired pivot point and said lever has an elongated slot, of a size sufficient to receive said pivot, communicating with said aperture and being generally offset therefrom and extending longitudinally toward said weight securement means.

16. A filter bag tensioning device as in claim 15 wherein said filter bag support means, said pivot aperture and said weight securement means are in substantial longitudinal alignment.

17. A filter bag tensioning device as in claim 16 wherein said pivot aperture and said elongated slot taken together form a substantially L-shaped opening in said lever.

* * * * *